(12) United States Patent
Asakawa et al.

(10) Patent No.: US 8,932,713 B2
(45) Date of Patent: Jan. 13, 2015

(54) WET FRICTION MATERIAL

(75) Inventors: Kenta Asakawa, Gunma (JP); Noriyoshi Ono, Gunma (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/818,888

(22) PCT Filed: Jul. 6, 2011

(86) PCT No.: PCT/JP2011/065477
§ 371 (c)(1),
(2), (4) Date: Apr. 26, 2013

(87) PCT Pub. No.: WO2012/026220
PCT Pub. Date: Mar. 1, 2012

(65) Prior Publication Data
US 2013/0202903 A1 Aug. 8, 2013

(30) Foreign Application Priority Data
Aug. 26, 2010 (JP) .................. 2010-189251

(51) Int. Cl.
*B32B 5/16* (2006.01)
(52) U.S. Cl.
USPC ........... 428/402; 428/323; 428/326; 428/530; 428/537.5
(58) Field of Classification Search
USPC ................. 428/323, 530, 537.5, 326, 402
IPC ..................... C09K 3/14; F16D 69/02
See application file for complete search history.

(56) References Cited

U.S. PATENT DOCUMENTS 1,687,454 A * 10/1928 Brown et al. .................. 51/300
2010/0330335 A1* 12/2010 Ciupak et al. ................ 428/143

FOREIGN PATENT DOCUMENTS

| JP | 1-269734 | | 10/1989 |
| JP | 01-269734 | * | 10/1989 |
| JP | 9-59599 | | 3/1997 |
| JP | 09-059599 | * | 3/1997 |
| JP | 2009-132906 | | 6/2009 |

OTHER PUBLICATIONS

International Search Report issued Sep. 27, 2011 in International (PCT) Application No. PCT/JP2011/065477.

* cited by examiner

*Primary Examiner* — Leszek Kiliman
(74) *Attorney, Agent, or Firm* — Wenderoth, Lind & Ponack, L.L.P.

(57) ABSTRACT

The wet friction material of the present invention is obtained by impregnating a friction base material with a bonding resin composition comprising a resol phenolic resin and a maleinized drying oil and curing the resulting material. The maleinized drying oil is obtained by reacting a drying oil such as tung oil or linseed oil with anhydrous maleic acid. The content thereof is preferably 50 to 250 parts by weight, based on 100 parts by weight of the resol phenolic resin. The wet friction material of the present invention has a high static friction coefficient and excellent durability.

4 Claims, No Drawings

WET FRICTION MATERIAL

TECHNICAL FIELD

The present invention relates to wet friction materials useful for wet clutches in vehicular automatic transmissions, synchronizer rings in manual transmissions, motorcycle wet multi-plate clutch discs, wet brakes, and the like.

BACKGROUND ART

Conventionally, paper friction materials comprising paper as a base material have been mainly used as wet friction materials. The paper friction materials are produced by mixing various kinds of friction modifiers with pulp, then performing papermaking, and impregnating the resulting material with a bonding resin represented by a phenol resin, followed by curing. The paper friction materials are applied to a wide range of uses because they have an appropriate friction coefficient. However, these days, in order to improve vehicle fuel efficiency and cope with the increased loads put on wet friction materials by increased engine output and increases in vehicle weights, there are demands for further increases in the friction coefficient and further improved durability.

Patent Reference 1 proposes wet friction materials using a phenol resin modified with a drying oil such as tung oil as a bonding resin.

Patent Reference 1: Japanese Patent Laid-Open No. 1-269734

SUMMARY OF THE INVENTION

Problems to be Solved by the Invention

However, when using the drying oil modified phenol resin described in Patent Reference 1, there were problems in that the durability and mechanical strength were reduced, although the friction coefficient can be effectively increased.

Therefore, the present invention was made to solve the above problems. The object of the present invention is to provide wet friction materials which have a high friction coefficient and are excellent in durability such as heat resistance and mechanical strength.

Means for Solving the Problems

The inventors of the present application, after conducting intensive studies for developing wet friction materials having a high static friction coefficient and excellent durability, have found that the above problems can be solved by using a resin composition comprising a resol phenolic resin and a maleinized drying oil as a bonding resin of wet friction material.

Namely, the present invention relates to a wet friction material obtained by impregnating a friction base material with a bonding resin composition comprising a resol phenolic resin and a maleinized drying oil and curing the resulting material.

Effect of the Invention

According to the present invention, wet friction materials having a high static friction coefficient and excellent durability can be provided.

MODE FOR CARRYING OUT THE INVENTION

The wet friction material of the present invention can be obtained by impregnating a friction base material with a bonding resin composition comprising a resol phenolic resin and a maleinized drying oil and curing the resulting material.

The maleinized drying oil used in the present invention can be obtained by reacting a drying oil with anhydrous maleic acid. As the maleinized oil prepared in this manner exhibits increased polarity, effects that various kinds of solvents can be selected and that compatibility with the friction base material and compatibility with the resol phenolic resin are improved are obtained.

The drying oil includes tung oil, linseed oil, castor oil, linolenic oil, linoleic oil, and the like. These drying oils may be used alone or in combination with two or more thereof. Among them, tung oil is preferable because of its excellent reactivity and low cost.

The reaction ratio of anhydrous maleic acid with double bonds present in the drying oil (hereinafter, referred to as the maleinization ratio) is preferably 10 to 50 mol %, more preferably 10 to 30 mol % in terms of reaction efficiency and polarity improvement. If the maleinization ratio is less than 10 mol %, there may be a case where sufficient polarity cannot be obtained. On the other hand, it is difficult to obtain a maleinized drying oil having a maleinization ratio of more than 50 mol % because of reactivity of the drying oil with anhydrous maleic acid. In order to promote the reaction of the drying oil with anhydrous maleic acid, a catalyst such as triethylamine may be used.

As drying oils originally contain a large number of carbon bonds, solvents that can dissolve drying oils are limited to those exhibiting low polarity including ketones such as acetone and toluene. However, the maleinized drying oil used in the present invention can be dissolved in a solvent exhibiting high polarity including alcohols such as methanol because it exhibits increased polarity. Amines may be added to the maleinized drying oil so as to further increase the polarity. As described above, as kinds of selectable solvents are increased, due to increased polarity, safety is improved. Specifically, as acetone has a small lower explosion limit value, the amount of acetone used as a solvent is limited, while as methanol has a lower explosion limit value that is higher than that of acetone, the amount of methanol used as a solvent may be increased.

Examples of amines to be added to the maleinized drying oils include primary amines such as methylamine, ethylamine, propylamine, and aniline, secondary amines such as dimethylamine and diethylamine, tertiary amines such as triethylamine, triethanolamine, dimethylethanolamine, methyldiethanolamine, and diethylethanolamine. These amines may be used alone or in combination with two or more thereof. Among them, alcohol amines such as dimethylethanolamine, triethanolamine, methyldiethanolamine, and diethylethanolamine are preferable because they exhibit a high effect to increase polarity.

The amount of the maleinized drying oil in the bonding resin composition is preferably 50 to 250 parts by weight, more preferably 100 to 200 parts by weight, based on 100 parts by weight of the resol phenolic resin in terms of the effect on friction properties and mechanical strength.

The resol phenolic resin used in the present invention includes those obtained by reacting a phenol with a formaldehyde in the presence of a base catalyst. Those obtained by reacting a phenol with a drying oil in the presence of an acidic catalyst and further reacting with an aldehyde in the presence of a base catalyst are preferable in terms of their compatibility with the maleinized drying oil and bonding strength.

Examples of phenols include monovalent phenols including phenols such as phenol, o-cresol, m-cresol, p-cresol, o-ethylphenol, m-ethylphenol, p-ethylphenol, o-isopropylphenol, m-propylphenol, p-propylphenol, p-sec-butylphenol, p-tert-butylphenol, p-cyclohexylphenol, p-nonylphenol, p-chlorophenol, o-bromophenol, m-bromophenol, and p-bromophenol, naphthols such as α-naphthol and β-naphthol, and xylenols such as 2,4-xylenol, 2,5-xylenol, and 2,6-xylenol; divalent phenols including resorcin, catechol, hydroquinone, 2,2-bis(4'-hydroxyphenyl)propane, 1,1'-bis(dihydroxyphenyl)methane, 1,1'-bis(dihydroxynaphthyl)methane, tetramethylbiphenol, biphenol, hexamethylbiphenol, cashew nut oil, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, and 2,7-dihydroxynaphthalene; and trivalent phenols such as trishydroxyphenylmethane. These phenols may be used alone or in combination with two or more thereof. Among them, phenol, o-cresol, m-cresol, p-nonylphenol, and cashew nut oil are preferable in terms of reactivity and compatibility with the drying oil.

Examples of aldehydes include formaldehyde, paraformaldehyde, metaformaldehyde, acetaldehyde, propionaldehyde, polyoxymethylene, chloral, hexamethylenetetramine, furfural, glyoxal, n-butylaldehyde, caproaldehyde, allylaldehyde, benzaldehyde, crotonaldehyde, acrolein, tetraoxymethylene, phenylacetaldehyde, o-tolaldehyde, salicylaldehyde, and the like. These aldehydes may be used alone or in combination with two or more thereof.

Publicly known friction base materials used in wet friction materials may be used without limitation as the friction base materials of the present invention. Examples thereof include sheet-like friction base materials made of natural pulp fibers such as wood pulp, organic synthetic fibers such as aramid fibers, or inorganic fibers such as glass fibers, carbon fibers, ceramic fibers, or metal fibers alone or in combination with two or more thereof. Further, friction base materials prepared by mixing an inorganic powder substance such as graphite, molybdenum disulfide, barium sulfate, or a silica powder or an organic powder substance such as cashew dust or a fluororesin powder as a friction modifier may be used.

The wet friction material of the present invention can be produced by a publicly known method, specifically by impregnating a sheet-like friction base material with the bonding resin composition above, curing by heat, punching the resulting material into a ring shape, and bonding the same to a core with a phenolic resin adhesive.

EXAMPLES

The present invention will be further explained in detail with reference to examples.

Synthesis Example 1

After 100 parts by weight of tung oil, 10 parts by weight of anhydrous maleic acid, and 0.1 part by weight of triethylamine were charged into a 1 L three-necked separable flask equipped with a stirrer, a condenser, and a thermometer, reacted at 165° C. for one hour, and cooled to 40° C. or lower, 5.5 parts by weight of dimethylethanolamine was added and was mixed to obtain maleinized tung oil (A) having a maleinization ratio of 30 mol %. The maleinization ratio of the maleinized tung oil was calculated, considering the total number of double bonds in eleostearic acid triglyceride which is a main component of the tung oil as 100 mol %.

Synthesis Example 2

After 100 parts by weight of tung oil, 3.4 parts by weight of anhydrous maleic acid, and 0.1 part by weight of triethylamine were charged into a 1 L three-necked separable flask equipped with a stirrer, a condenser, and a thermometer, reacted at 165° C. for one hour, and cooled to 40° C. or lower, 2.0 parts by weight of dimethylethanolamine was added and was mixed to obtain maleinized tung oil (B) having a maleinization ratio of 10 mol %.

Synthesis Example 3

To a 1 L three-necked separable flask equipped with a stirrer, a condenser, and a thermometer, 75 parts by weight of phenol, 24.9 parts by weight of nonylphenol, 0.1 part by weight of cashew nut oil, 40 parts by weight of tung oil, and 0.29 part by weight of sulfuric acid were charged and reacted at 160° C. for 30 min. Next, 71.1 parts by weight of 37 wt % formalin and 3.6 parts by weight of 25 wt % ammonia water were added and were reacted at 80° C. for two hours, and then were concentrated under reduced pressure. Further, the resulting material was diluted with a mixture solvent of MEK and methanol to obtain a tung-oil modified resol phenolic resin composition having a resin content of about 60 wt %.

Synthesis Example 4

To a 1 L three-necked separable flask equipped with a stirrer, a condenser, and a thermometer, 75 parts by weight of phenol, 24.9 parts by weight of nonylphenol, 0.1 part by weight of cashew nut oil, 40 parts by weight of linseed oil, and 0.29 part by weight of sulfuric acid were charged and reacted at 160° C. for 30 min. Next, 71.1 parts by weight of 37 wt % formalin and 3.6 parts by weight of 25 wt % ammonia water were added and were reacted at 80° C. for two hours, and then were concentrated under reduced pressure. Further, the resulting material was diluted with a mixture solvent of MEK and methanol to obtain a linseed-oil modified resol phenolic resin composition having a resin content of about 60 wt %.

Synthesis Example 5

To a 1 L three-necked separable flask equipped with a stirrer, a condenser, and a thermometer, 100 parts by weight of phenol, 95.8 parts by weight of 37 wt % formalin, and 3.6 parts by weight of 25 wt % ammonia water were charged and reacted at 80° C. for two hours, and then were concentrated under reduced pressure. Further, the resulting material was diluted with methanol to obtain a resol phenolic resin composition having a resin content of about 60 wt %.

Synthesis Example 6

To a 1 L three-necked separable flask equipped with a stirrer, a condenser, and a thermometer, 75 parts by weight of phenol, 24.9 parts by weight of nonylphenol, 0.1 part by weight of cashew nut oil, 40 parts by weight of tung oil, and 0.29 part by weight of sulfuric acid were charged and reacted at 160° C. for 30 min. Next, 71.1 parts by weight of 37 wt % formalin and 3.6 parts by weight of 25 wt % ammonia water were added, were reacted at 80° C. for two hours, and then were concentrated under reduced pressure. Further, the resulting material was diluted with a mixture solvent of MEK and methanol to obtain a tung-oil modified resol phenolic resin composition having a resin content of about 50 wt %.

Example 1

To 100 parts by weight of the tung-oil modified resol phenolic resin composition obtained in Synthesis example 3 (the amount of the maleinized tung oil based on 100 parts by weight of the tung-oil modified resol phenolic resin being about 105.4 parts by weight) was added 66.5 parts by weight of the maleinized tung oil (A) obtained in Synthesis example 1 and were mixed at 40° C. to obtain a bonding resin composition.

After the bonding resin composition was diluted with methanol such that the resin content was 30 wt %, a sheet-like paper base material was impregnated with the resulting material and was dried at room temperature for 30 min. The sheet was preliminarily cured in an oven at 180° C. for 10 min and then was cured in the oven at 220° C. for 20 min. The obtained sheet was punched into a ring shape to prepare the wet friction material of Example 1 in accordance with a general technical means.

Example 2

To 100 parts by weight of the linseed-oil modified resol phenolic resin composition obtained in Synthesis example 4 (the amount of the maleinized tung oil based on 100 parts by weight of the linseed-oil modified resol phenolic resin being about 105.4 parts by weight) was added 66.5 parts by weight of the maleinized tung oil (A) obtained in Synthesis example 1 and was mixed at 40° C. to obtain a bonding resin composition.

After the bonding resin composition was diluted with methanol such that the resin content was 30 wt %, a sheet-like paper base material was impregnated with the resulting material and was dried at room temperature for 30 min. The sheet was preliminarily cured in an oven at 180° C. for 10 min and then was cured in the oven at 220° C. for 20 min. The obtained sheet was punched into a ring shape to prepare the wet friction material of Example 2 in accordance with a general technical means.

Example 3

To 100 parts by weight of the resol phenolic resin composition obtained in Synthesis example 5 (the amount of the maleinized tung oil based on 100 parts by weight of the resol phenolic resin being about 200 parts by weight) was added 127.4 parts by weight of the maleinized tung oil (A) obtained in Synthesis example 1 and was mixed at 40° C. to obtain a bonding resin composition.

After the bonding resin composition was diluted with methanol such that the resin content was 30 wt %, a sheet-like paper base material was impregnated with the resulting material and was dried at room temperature for 30 min. The sheet was cured in an oven at 220° C. for 10 min. The obtained sheet was punched into a ring shape to prepare the wet friction material of Example 3 in accordance with a general technical means.

Example 4

To 100 parts by weight of the tung-oil modified resol phenolic resin composition obtained in Synthesis example 3 (the amount of maleinized tung oil based on 100 parts by weight of the tung-oil modified resol phenolic resin being about 108.7 parts by weight) was added 66.5 parts by weight of maleinized tung oil (B) obtained in Synthesis example 2 and was mixed at 40° C. to obtain a bonding resin composition.

After the bonding resin composition was diluted with methanol such that the resin content was 30 wt %, a sheet-like paper base material was impregnated with the resulting material and was dried at room temperature for 30 min. The sheet was cured in an oven at 220° C. for 10 min. The obtained sheet was punched into a ring shape to prepare the wet friction material of Example 4 in accordance with a general technical means.

Comparative Example 1

After the resol phenolic resin composition obtained in Synthesis example 5 was diluted with methanol such that the resin content was 30 wt %, a sheet-like paper base material was impregnated with the resulting material and was dried at room temperature for 30 min. This sheet was cured in an oven at 220° C. for 10 min. The obtained sheet was punched into a ring shape to prepare the wet friction material of Comparative example 1 in accordance with a general technical means.

Comparative Example 2

To 100 parts by weight of the tung-oil modified resol phenolic resin composition obtained in Synthesis example 6 was added 170.9 parts by weight of non-maleinized tung oil and was mixed at 40° C. to obtain a bonding resin composition.

After the bonding resin composition was diluted with methanol such that the resin content was 30 wt %, a sheet-like paper base material was impregnated with the resulting material and was dried at room temperature for 30 min. This sheet was cured in an oven at 220° C. for 10 min. The obtained sheet was punched into a ring shape to prepare the wet friction material of Comparative example 2 in accordance with a general technical means.

Comparative Example 3

After the tung-oil modified resol phenolic resin composition obtained in Synthesis example 6 was diluted with methanol such that the resin content was 30 wt %, a sheet-like paper base material was impregnated with the resulting material and was dried at room temperature for 30 min. This sheet was cured in an oven at 220° C. for 10 min. The obtained sheet was punched into a ring shape to prepare the wet friction material of Comparative example 3 in accordance with a general technical means.

The performance of the wet friction materials prepared in the examples and comparative examples were determined under the conditions shown in Table 1 by a SAE#2 friction testing machine. The determined results and maleinization ratios of the drying oils are summarized in Table 2.

TABLE 1

| Measuring conditions by SAE#2 friction testing machine (manufactured by Shinko Engineering Co., Ltd.) | |
|---|---|
| Items | Conditions |
| Surface pressure | 8.0 kg/cm$^2$ |
| Oil lubrication type | 700 cc |
| Oil temperature | 100° C. |
| Rotational speed | 3600 rpm (dynamic friction) |
|  | 0.7 rpm (static friction) |
| Inertia mass | 3.5 kg · cm · sec$^2$ |
| Number of cycles | 200 cycles |

TABLE 2

|  | Example 1 | Example 2 | Example 3 | Example 4 | Comparative Example 1 | Comparative Example 2 | Comparative Example 3 |
| --- | --- | --- | --- | --- | --- | --- | --- |
| Maleinization ratio | 30 mol % | 30 mol % | 30 mol % | 10 mol % | 0% | 0% | 0% |
| Static friction coefficient | 0.149 | 0.144 | 0.141 | 0.143 | 0.116 | 0.146 | 0.126 |
| Wear volume (μm) | 14 | 13 | 12 | 13 | 12 | 35 | 21 |

As shown in Table 2, the wet friction materials of Examples 1-4 had a high static friction coefficient of 0.141 or higher and excellent durability such as a wear volume of 14 μm or less. On the other hand, the wet friction material of Comparative example 1 using only the resol phenolic resin had a low static friction coefficient of 0.116. The wet friction material of Comparative example 2 using both the tung-oil modified resol phenolic resin and non-maleinized tung oil had a large wear volume of 35 μm and was inferior in durability. In addition, the wet friction material of Comparative example 3 using only the tung-oil modified resol phenolic resin had a static friction coefficient of 0.126 and a wear volume of 21 μm.

As described above, as the wet friction material of the present invention has a high static friction coefficient and excellent durability, it can be said that it is extremely useful for automotive clutches, wet brakes, and the like.

The invention claimed is:

1. A wet friction material obtained by impregnating a friction base material with a bonding resin composition comprising a resol phenolic resin and a maleinized drying oil and curing the resulting material.

2. The wet friction material according to claim 1, wherein the resol phenolic resin is a resol phenolic resin reacted with an unmaleinized drying oil.

3. The wet friction material according to claim 1, wherein the maleinization ratio of the maleinized drying oil is 10 to 50 mol %, and wherein the maleinization ratio represents the reaction ratio of anhydrous maleic acid with double bonds present in an unmaleinized drying oil.

4. The wet friction material according to claim 1, wherein the amount of the maleinized drying oil in the bonding resin composition is 50 to 250 parts by weight, based on 100 parts by weight of the resol phenolic resin.

* * * * *